United States Patent
Moore

(10) Patent No.: US 8,191,569 B2
(45) Date of Patent: Jun. 5, 2012

(54) KETTLE VALVE ASSEMBLY WITH RETAINED O RING

(76) Inventor: William Moore, San Leandro, CA (US)

(*) Notice: Subject to any disclaimer, the term of this patent is extended or adjusted under 35 U.S.C. 154(b) by 432 days.

(21) Appl. No.: 12/549,738

(22) Filed: Aug. 28, 2009

(65) Prior Publication Data

US 2010/0308249 A1   Dec. 9, 2010

Related U.S. Application Data

(60) Provisional application No. 61/185,195, filed on Jun. 9, 2009.

(51) Int. Cl.
*F16K 5/06*   (2006.01)

(52) U.S. Cl. ........ 137/360; 222/542; 222/544; 222/569; 251/144; 251/315.1; 285/918

(58) Field of Classification Search ............. 251/315.01–315.16, 144; 222/542, 222/544, 568–569; 137/350, 360; 285/918
See application file for complete search history.

(56) References Cited

U.S. PATENT DOCUMENTS

| | | | | |
|---|---|---|---|---|
| 3,730,224 A * | 5/1973 | Prisk | | 137/625.33 |
| 4,023,773 A * | 5/1977 | Wise | | 251/148 |
| 4,684,105 A * | 8/1987 | Haas, II | | 251/150 |
| 5,082,246 A * | 1/1992 | Stanley et al. | | 251/315.14 |
| 5,090,447 A * | 2/1992 | Lewis et al. | | 137/559 |
| 5,232,200 A * | 8/1993 | Combeau | | 251/315.01 |
| 5,429,151 A * | 7/1995 | Millett et al. | | 137/315.18 |
| 5,911,402 A * | 6/1999 | Lavoie | | 251/144 |
| 6,206,034 B1 * | 3/2001 | McHugh | | 137/559 |
| 6,427,872 B1 * | 8/2002 | Anderson | | 222/83 |
| 7,306,010 B2 * | 12/2007 | Gruener, Sr. | | 137/797 |
| 2006/0225799 A1* | 10/2006 | Gross | | 137/899.2 |

* cited by examiner

*Primary Examiner* — John Bastianelli
(74) *Attorney, Agent, or Firm* — Steven A. Nielsen; Allman & Nielsen, P.C.

(57) ABSTRACT

A valve assembly uses an O ring contained within a void such that the outer edges of the valve assembly reach the outer mid section of the O ring. A kettle for brewing beer or heating other fluid is drilled so as to accommodate the disclosed valve. The O ring is pressed and held against the outside surface of the kettle wall. A retaining nut placed within the kettle further secures the valve to the kettle. As the surface of the kettle heats during use, the contained O ring retains sufficient contact with the valve and kettle so as to prevent leakage.

2 Claims, 7 Drawing Sheets

KETTLE VALVE ASSEMBLY WITH RETAINED O RING

RELATED APPLICATION AND INCORPORATION BY REFERENCE

This is a utility application based upon U.S. patent application Ser. No. 61/185,195 entitled "Kettle Valve" filed on Jun. 9, 2009. This related application is incorporated herein by reference and made a part of this application. If any conflict arises between the disclosure of the invention in this utility application and that in the related provisional application, the disclosure in this utility application shall govern. Moreover, the inventor incorporates herein by reference any and all patents, patent applications, and other documents hard copy or electronic, cited or referred to in this application.

BACKGROUND OF THE INVENTION (1) Field of the Invention

The invention generally relates to means and methods of securing values within containers. More particularly, the invention relates to a valve assembly having means of attachment to a container, such that heat from the container does not break the integrity of the seal between the valve and container and such that welding is not needed to secure the valve to the container.

(2) Description of the Related Art

In the known related art, means of enabling a consumer to attach a valve to a beer making kettle did not exist. In the known prior art, attempts to forgo welding when attaching a valve to a beer brewing kettle were unsuccessful.

BRIEF SUMMARY OF THE INVENTION

The present invention overcomes shortfalls in the related art by presenting an unobvious and unique combination and configuration of valve components to provide an assembly capable of being attached to a beer brewing kettle without the need for welding or expensive tools.

As shown in the attached drawings, a unique O ring container groove retains an O ring such that the O ring will not move when the kettle is heated. A locking nut sits on a threaded tube and is used on the inside of the kettle to secure the assembly via the outside vertical wall of the kettle. The O ring presses against the outside wall of the kettle and forms a seal that maintains integrity even when fluid within the kettle is heated.

The outside end of the tube features interior threads and means for retaining a filter.

Unexpected results are achieved as a lay person may install the disclosed assembly into a kettle without the need for welding. The retention groove secures the O ring around the midpoint of O ring's outer circumference. The retention groove encloses approximately one half of the outer circumference of the O ring such that the O ring is securely contained when pressed against a kettle and when fluid within the kettle is heated. The configuration of the O ring and retention groove is not found within the industry, and provides efficient means of securing a valve to a kettle. The disclosed configuration has found commercial success in a very competitive and active industry.

The home brewer of beer and other beverages may now successfully add a valve to a kettle without the need or use of welding equipment or expensive tools. The disclosed assembly overcomes the long felt need in the art of kettle valves by, inter alia, overcoming the expansion and contraction problems that have made non-welded valves impractical.

These and other objects and advantages will be made apparent when considering the following detailed specification when taken in conjunction with the drawings.

Figure 1:
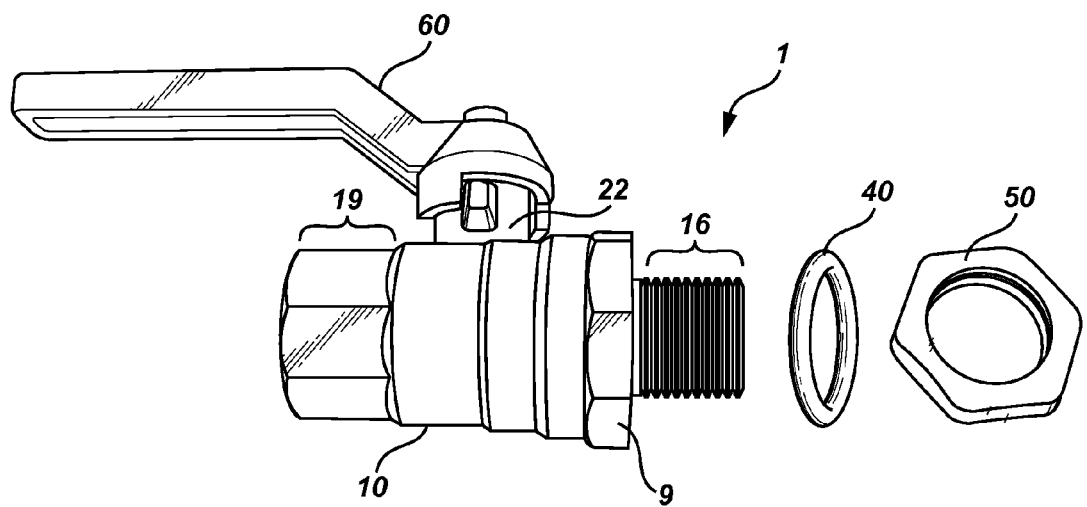
FIG. 1 is perspective view of the disclosed valve assembly wherein the locking nut and O ring are not attached.

REFERENCE NUMERALS IN THE DRAWINGS 1 valve assembly or the invention in general
8 fluid passage way of valve body 10
9 exterior surface, of retaining groove
10 valve body or body
11 retaining groove, a void used to retain the O ring 40
12 retaining groove floor
13 distal retaining groove sidewall
14 medial retaining groove sidewall
15 retaining groove shoulder surface
16 insertion barrel
17 interior threads, of insertion barrel
18 exterior threads, of insertion barrel
19 output barrel, where the contents of a kettle exit
20 interior threads, of output barrel
21 stem void, within stem wall
22 stem wall
23 lever stopper, on exterior of stem wall
30 valve ball
31 interior concave walls, of valve ball
32 exterior spherical surface, of valve ball
33 passage void, within center of valve ball
34 stem
35 valve packing, on output barrel side
36 valve packing, on kettle side
37 valve ball void, found within the valve body 10
40 O ring
41 outer middle section, of O ring
50 retaining nut
51 circular compression surface, on face of retaining nut
52 interior threads, within retaining nut
53 exterior flattened surfaces, of retaining nut
60 control lever
61 control cap
70 kettle
71 vertical wall of kettle
72 exterior wall surface, of kettle 73 interior wall surface, of kettle
74 lid of kettle
80 drill
81 circular drill bit

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

Referring to FIG. 1 the invention 1 is shown fully assembled, except the O ring 40 and retaining nut 50 are shown unassembled and near the insertion barrel 16. A control lever 60 rests upon a cylinder stem wall 22 Referring to FIGS. 1 and 2, the body 10 of the valve assembly features an insertion barrel 16, an output barrel 19, a stem wall 22, a valve ball void 37, interior threads 20 within the output barrel, interior threads 17 and exterior threads 18 of the insertion barrel 16.

Figure 2:
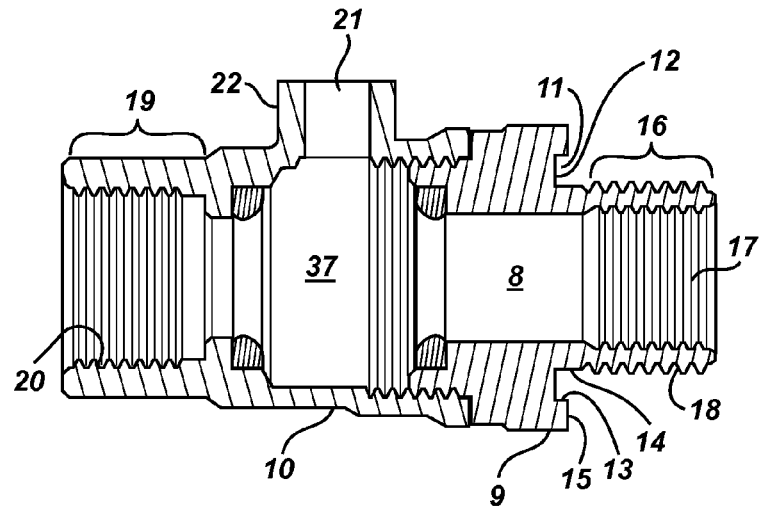
FIG. 2 is a sectional view of the valve body without the valve ball or stem in place.

FIG. 2 presents a sectional view of the valve body 10 without the valve ball, stem, lever control, O ring or retaining nut. But, FIG. 2 does illustrate various surfaces that define the retaining groove 11 void which accepts and retains the O ring 40. A retaining groove floor 12 has an outward or distal retaining groove sidewall 13 and an inner or medial retaining groove sidewall 14. A retaining groove shoulder surface 15 is adjacent to the distal retaining groove sidewall 13. The retaining groove shoulder surface 15 may be set flush or near flush to the outer surface of a kettle.

Figure 3:
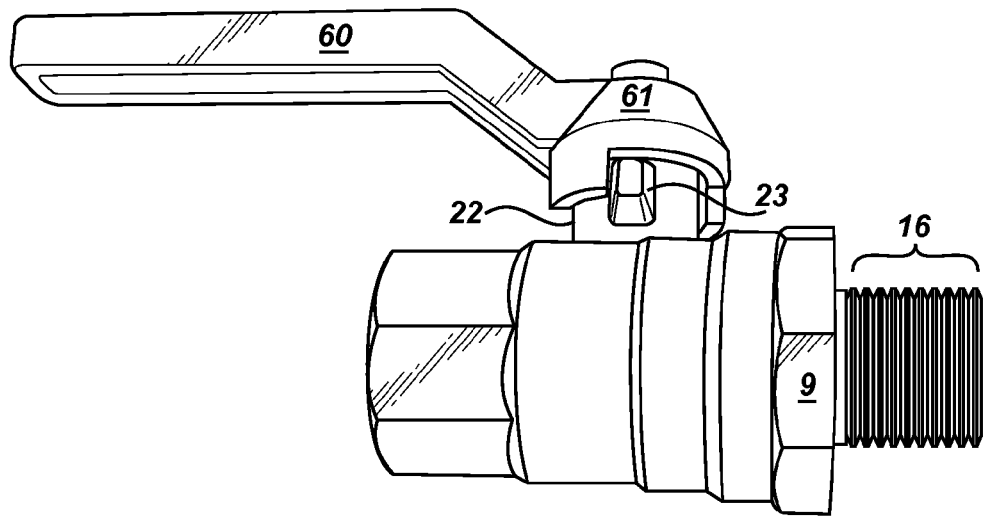
FIG. 3 is a side perspective view of the disclosed valve assembly.

FIG. 3 more clearly shows the control cap being stopped by the lever stopper 23, with the lever stopper being integral to the stem wall 22.

Figure 4:
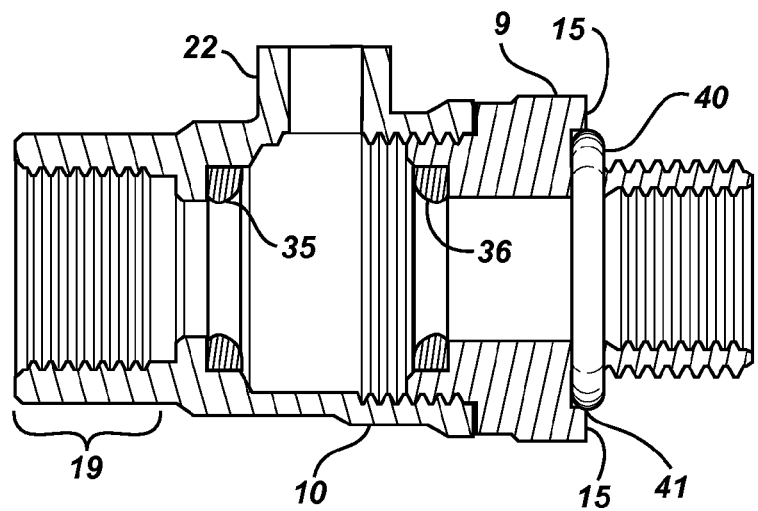
FIG. 4 is a cross sectional view of the valve body with an O ring secured within the retaining groove.

FIG. 4 shows the O ring 40 placed within the retaining groove. The outer middle section 41 of the O ring is shown to rest at the inner edge of the retaining groove shoulder surface 15. During installation within a kettle, the sidewall of a kettle may press the O ring flush or near flush with the retaining groove shoulder surface 15.

Figure 5:
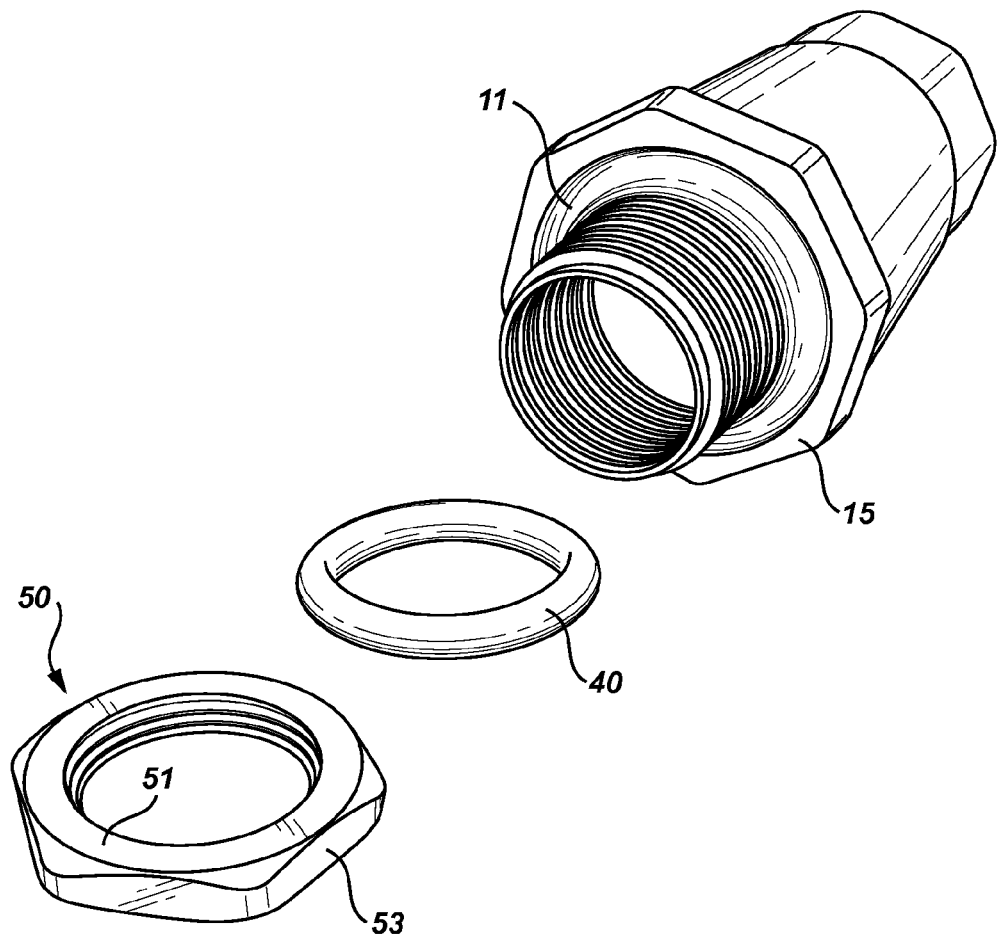
FIG. 5 is a top perspective view of the valve body with a detached O ring and detached retaining nut.

FIG. 5 shows an empty retaining groove 11 void and the adjacent retaining groove shoulder surface 15, which is used to press against the outer surface of a kettle wall. The circular compression surface 51 found on the face of the retaining nut 50 is used to press against the outside surface of a kettle.

Figure 6:
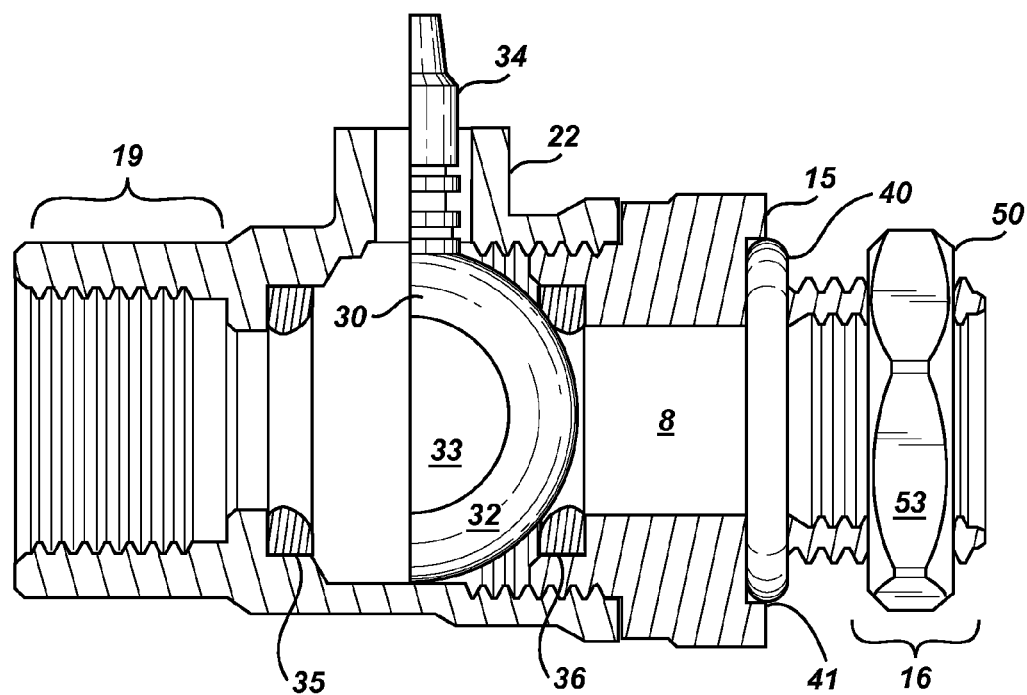
FIG. 6 is a side sectional view of the valve body with the O ring placed within the valve body and with a halved ball valve and stem inserted into the ball cavity.

FIG. 6 is a section view of the valve body 10 and introduces a sectional view of halved stem 34 attached to a halved valve ball 30, with the valve ball being in a closed position. The passage void 33 is shown closed position or in a position perpendicular to the fluid passage way 8 of the valve body 10. The exterior spherical surface 32 of the valve ball is shown resting upon valve packing 36 on the kettle side of the assembly. When in the closed position, the exterior spherical surface 32 of the valve ball blocks fluid held within the fluid passage way 8. The valve packing 36 is shaped to accommodate the exterior spherical surface 32 of the valve ball such that fluid does not pass into the output barrel 19.

FIG. 6 also shows that the retaining groove sidewalls are of a depth to reach the outer middle section 41 of the O ring. Thus, the retaining groove shoulder surface 15 will also mark the outer middle section 41 of the O ring 40.

Figures 7, 8:
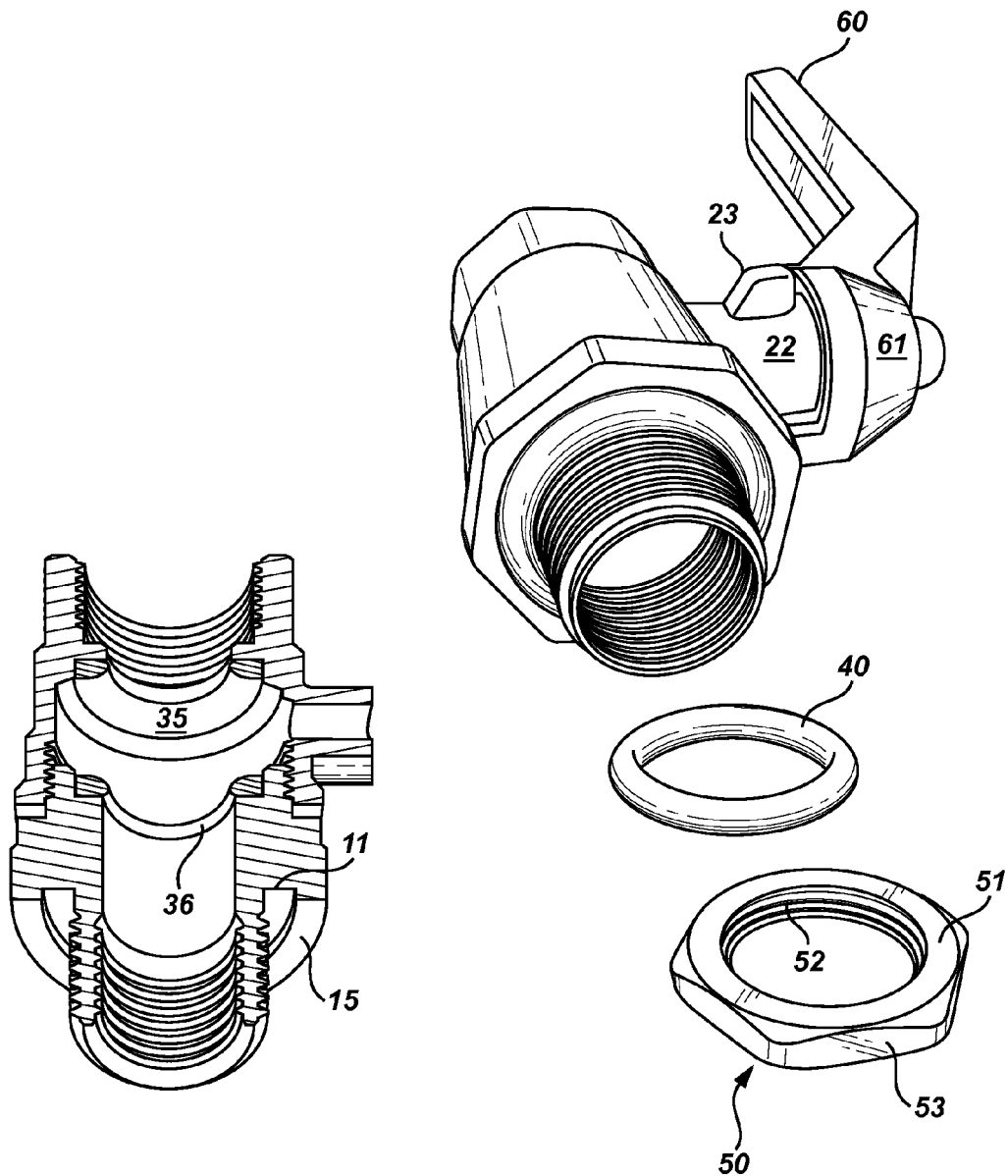
FIG. 7 is a front perspective sectional view of a valve body.
FIG. 8 is a front perspective view of a valve assembly with a detached O ring and retaining nut.

FIG. 7 shows a perspective sectional view of a halved valve body 10 and provides a different view of the two valve packings 35 and 36. FIG. 8 provides an alternative view of the stem wall 22 and lever stopper 23.

Figure 9:
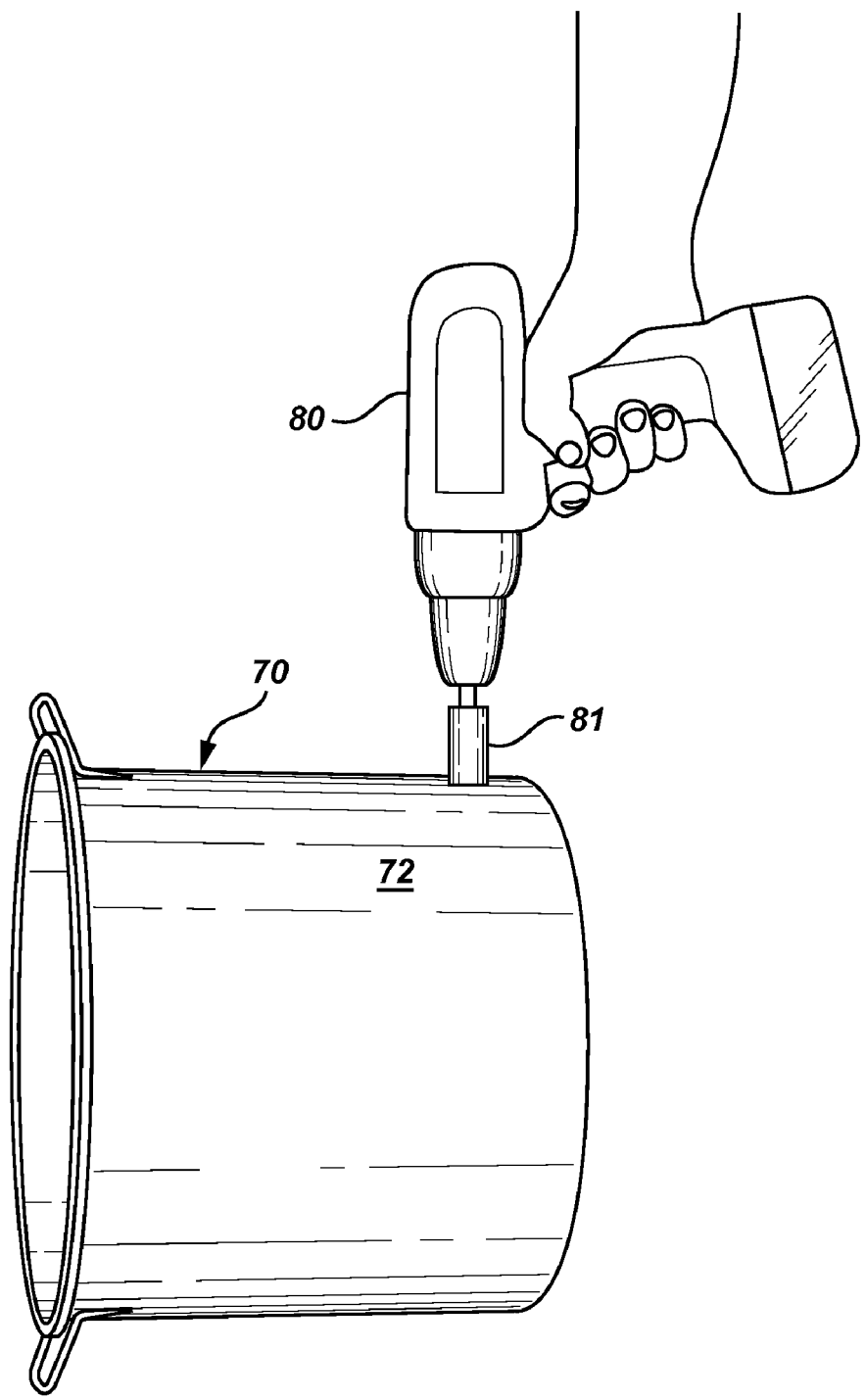
FIG. 9 is a perspective view of a drill creating a void within a brewing kettle.

FIG. 9 shows a drill 80 turning a circular drill bit 81 into the exterior surface 72 of a kettle 70 in order to create a void within the vertical wall of the kettle. An unanticipated and unobvious advantage of the present invention is the ability of the disclosed valve assembly to be secured to and within a kettle without the need to melt the kettle or weld upon the kettle.

Figure 10:
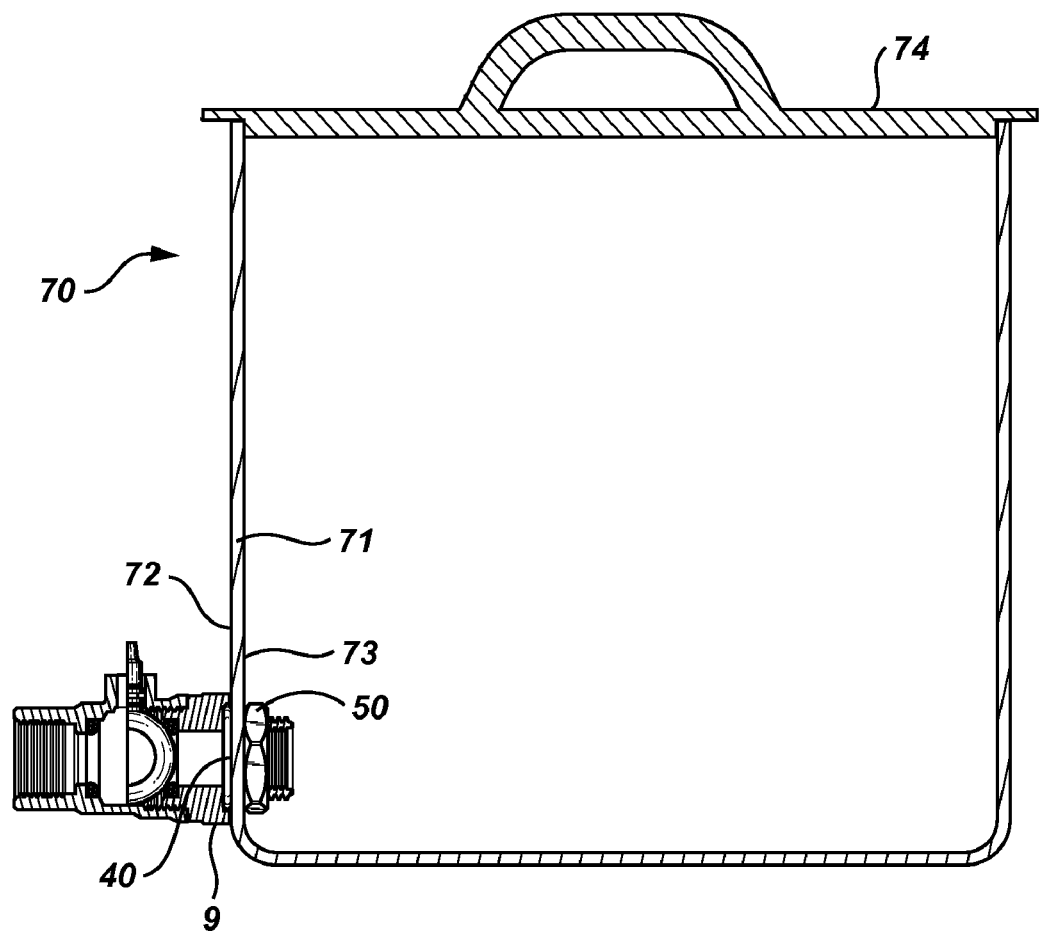
FIG. 10 is a sectional elevation view of the disclosed valve assembly installed into the vertical wall of a kettle.

FIG. 10 is a sectional elevational view and shows the invention attached to and within a kettle 70. After the creation of a void with of an approximate circumference of the insertion barrel 16, the insertion barrel 16 is inserted through the vertical sidewall 71 of the kettle. The valve assembly is pressed into the exterior surface 72 of the kettle such that the retaining groove shoulder surface 15 is flush or near flush with the exterior surface 72 of the kettle 70. The kettle lid 74 is placed on top of the kettle to illustrate the fact that fluid or a beer brew within a kettle may be heated and thus cause expansion of the vertical wall of the kettle.

The invention includes, but is not limited to the items recited herein.

Item 1. A valve assembly 1 for use within a kettle 70 and for integration within a kettle, without welding upon the kettle or melting the kettle, the valve assembly comprising:

a) valve body having a stem wall 22, output barrel 19, interior threads 20 within the output barrel, valve packing 35 located between the output barrel and a valve ball void 37, a stem wall 22 defining the upper sides of the valve ball void, and with the stem wall defining the sides of a stem void 21, valve packing 36 found after the valve ball void and adjacent to a fluid passage way 8 defined by the valve body and the valve body further defining a retaining groove 11;

b) the retaining groove being further defined by a retaining groove floor 12, a medial retaining groove sidewall 13 a distal groove sidewall 14 the latter being adjacent to a retaining groove shoulder surface 15;

c) an insertion barrel 16 attached to the medial retaining groove sidewall 14, with the insertion barrel having interior threads 17 and exterior threads 18;

d) an O ring 40 having sufficient size and diameter so as to fit within the retaining groove 11 and to have an outer middle section 41 that meets the plane of the retaining groove shoulder surface 15;

e) a retaining nut 50, having interior threads 52 compatible with the external threads 18 of the insertion barrel 16, the retaining nut also having exterior flattened surfaces 53 and a circular compression surface 51 suitable for compression against the interior wall of a kettle;

f) a valve ball 30 comprising an exterior spherical surface 32 and a passage void 33 defined by interior concave walls 31;

g) a stem 34 attached to the exterior spherical surface 32 of the valve ball 30, with the stem 34 placed within the stem void 21; and h) a control cap 61 attached to the stem 34 and a control lever 60 attached to the control cap 61.

Item 2. A method of integrating a valve assembly 1 into a kettle, without the use of welding or melting of the kettle, the method comprising:

a) creating a void within a vertical wall 71 of a kettle 70, with the void having a diameter no greater than an O ring 40 placed within a retaining groove 11 of a valve assembly;

b) placing the O ring 40 within the retaining groove 11;

c) inserting an insertion barrel 16 of the valve assembly through the void created within the kettle;

d) attaching a retaining nut 50 to exterior threads 18 of the insertion barrel 16; and e) rotating the retaining nut 50 until the retaining nut presses against an interior wall 73 of the kettle and the O ring compresses such that a retaining groove shoulder surface 15 of the valve assembly rests flush or within 1 mm to 5 mm of being flush with the exterior surface 72 of the kettle.

Item 3. The method of Item 2 using the valve assembly of item 1.

While certain aspects of the invention are presented below in certain claim forms, the inventor contemplates the various aspects of the invention in any number of claim forms. Accordingly, the inventor reserves the right to add additional claims after filing the application to pursue such additional claims.

What is claimed is:

1. A valve assembly for use with a kettle and for integration within a kettle, without welding upon the kettle or melting the kettle, the valve assembly consisting of:

a) a valve body having a stem wall, an output barrel, interior threads within the output barrel, a valve packing located between the output barrel and a valve ball void, the stem wall defining upper sides of the valve ball void, and with the stem wall defining sides of a stem void, the valve packing adjacent to the valve ball void and adjacent to a fluid passage way defined by the valve body and the valve body further defining a retaining groove;

b) the retaining groove being further defined by a retaining groove floor, a medial retaining groove sidewall, a distal groove sidewall, with the distal groove sidewall being adjacent to a retaining groove shoulder surface;

c) an insertion barrel attached to the medial retaining groove sidewall, with the insertion barrel having interior threads and exterior threads;

d) an O ring having sufficient size and diameter so as to fit within the retaining groove and the O ring having an outer middle section that meets the plane of the retaining groove shoulder surface, such that half of the O ring protrudes past the groove shoulder surface;

e) a retaining nut, having interior threads compatible with the external threads of the insertion barrel, the retaining nut also having exterior flattened surfaces at the outer perimeter of the retaining nut and the retaining nut having a circular compression surfaces on either side of the retaining nut;

f) a valve ball comprising an exterior spherical surface and a passage void defined by interior concave walls of the valve ball;

g) a stem attached to the exterior spherical surface of the valve ball, with the stem placed within the stem void; and h) a control cap attached to the stem and a control lever attached to the control cap such that rotation of the control lever rotates the control cap and ball valve.

2. The valve assembly of claim 1 secured to a kettle, the kettle having a vertical wall with the vertical wall having an exterior wall surface and an interior wall surface; the insertion barrel inserted through a void within the vertical wall with the insertion barrel passing thought the exterior wall surface and the interior wall surface of the kettle; the exterior wall surface pressing against the O ring with the O ring pressing against one of the retaining groove shoulder surface; the retaining nut threaded upon the exterior threads of the insertion barrel, with the circular compression surface of the retaining nut pressing upon the interior wall surface of the kettle's vertical wall.

* * * * *